US010647190B2

(12) United States Patent
Aoki et al.

(10) Patent No.: US 10,647,190 B2
(45) Date of Patent: May 12, 2020

(54) CONTROL SYSTEM FOR HYBRID VEHICLES

(71) Applicant: TOYOTA JIDOSHA KABUSHIKI KAISHA, Toyota-shi, Aichi-ken (JP)

(72) Inventors: Kazuma Aoki, Sunto-gun (JP); Tatsuya Imamura, Okazaki (JP); Yasuhiro Oshiumi, Gotemba (JP); Yukari Okamura, Gotemba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/173,129

(22) Filed: Oct. 29, 2018

(65) Prior Publication Data

US 2019/0126736 A1 May 2, 2019

(30) Foreign Application Priority Data

Oct. 30, 2017 (JP) .................. 2017-209597

(51) Int. Cl.
| | |
|---|---|
| *B60W 20/30* | (2016.01) |
| *B60K 6/365* | (2007.10) |
| *B60K 6/387* | (2007.10) |
| *B60K 6/442* | (2007.10) |
| *B60K 6/445* | (2007.10) |
| *B60K 6/383* | (2007.10) |
| *B60W 10/115* | (2012.01) |

(Continued)

(52) U.S. Cl.
CPC .............. *B60K 6/365* (2013.01); *B60K 6/383* (2013.01); *B60K 6/387* (2013.01); *B60K 6/442* (2013.01); *B60K 6/445* (2013.01); *B60K 6/547* (2013.01); *B60W 10/023* (2013.01); *B60W 10/115* (2013.01); *B60W 20/13* (2016.01); *B60W 20/30* (2013.01); *B60W 50/0097* (2013.01); *B60K 2006/381* (2013.01); *B60W 20/40* (2013.01); *B60W 2510/085* (2013.01); *B60W 2510/242* (2013.01); *B60W 2710/021* (2013.01); *B60W 2710/1005* (2013.01); *F16H 3/728* (2013.01); *F16H 2200/2007* (2013.01); *Y10T 477/26* (2015.01)

(58) Field of Classification Search
CPC ..... Y10T 477/26; B60W 20/30; B60W 10/11; B60W 2200/2007; B60W 2710/1005; B60W 2510/242; B60W 2510/085; B60W 20/13; B60W 20/40; B60K 6/365; B60K 6/445; B60K 6/442
See application file for complete search history.

(56) References Cited

U.S. PATENT DOCUMENTS

| | | | |
|---|---|---|---|
| 2015/0158481 A1* | 6/2015 | Tagawa ................. | B60W 10/10 701/22 |
| 2016/0368361 A1 | 12/2016 | Endo et al. | |
| 2019/0047543 A1* | 2/2019 | Aoki ..................... | B60W 20/10 |

FOREIGN PATENT DOCUMENTS

| | | |
|---|---|---|
| EP | 3 106 338 A1 | 12/2016 |
| JP | 2013-023156 A | 2/2013 |
| JP | 2017-007437 A | 1/2017 |

* cited by examiner

*Primary Examiner* — Roger L Pang
(74) *Attorney, Agent, or Firm* — Sughrue Mion, PLLC

(57) ABSTRACT

A control system for hybrid vehicle that can limit damage on a battery resulting from cranking of an engine. the controller is configured to shift an operating mode from an EV-Lo mode to an EV-Hi mode if a peak power applied to a battery during shifting the operating mode from the EV-Lo mode to the EV-Hi mode is expected to exceed an upper limit input power to the battery.

6 Claims, 12 Drawing Sheets

(51) Int. Cl.
   *B60W 10/02*   (2006.01)
   *B60K 6/547*   (2007.10)
   *B60W 50/00*   (2006.01)
   *B60W 20/13*   (2016.01)
   *F16H 3/72*        (2006.01)
   *B60K 6/38*        (2007.10)
   *B60W 20/40*       (2016.01)

Fig. 3

| Operating Mode | | CL1 | CL2 | B1 | MG1 | MG2 | ENG |
|---|---|---|---|---|---|---|---|
| HV Mode | HV-Lo Mode | ● | – | – | G | M | ON |
| | HV-Hi Mode | – | ● | – | G | M | ON |
| | Fixed Mode | ● | ● | – | | | ON |
| EV Mode | Dual-Motor Mode EV-Lo Mode | ● | – | ● | M | M | OFF |
| | Dual-Motor Mode EV-Hi Mode | – | ● | ● | M | M | OFF |
| | Single-Motor Mode | – | – | – | | M | OFF |

CONTROL SYSTEM FOR HYBRID VEHICLES

CROSS-REFERENCE TO RELATED APPLICATIONS

The present disclosure claims the benefit of Japanese Patent Application No. 2017-209597 filed on Oct. 30, 2017 with the Japanese Patent Office, the disclosures of which are incorporated herein by reference in its entirety.

BACKGROUND

Field of the Disclosure

Embodiments of the present disclosure relate to the art of a control system for a hybrid vehicle in which a prime mover includes an engine and a motor.

Discussion of the Related Art

JP-A-2017-007437 describes a drive unit for a hybrid vehicle comprising a first planetary gear unit and a second planetary gear unit. According to the teachings of JP-A-2017-007437, the first planetary gear unit comprises a first carrier connected to an engine, a first sun gear connected to a motor, and a first ring gear. The second planetary gear unit comprises a second carrier rotated integrally with the first ring gear, a second sun gear, and a second ring gear as an output member. The first carrier and the second sun gear are selectively engaged to each other by a first clutch, the second sun gear and the second ring gear are selectively engaged to each other by a second clutch, and a brake torque is applied to the first carrier by a brake. The hybrid vehicle taught by JP-A-2017-007437 can be propelled in an Electric Vehicle mode while stopping the engine by engaging the brake and any one of the first clutch and the second clutch.

According to the teachings of JP-A-2017-007437, a ratio of a speed of the first sun gear (i.e., a motor speed) to a speed of the second ring gear (i.e., an output speed) becomes greater in the EV mode in which the first clutch is engaged, in comparison with that in the EV mode in which the second clutch is engaged. In other words, during propulsion in the EV mode at a predetermined speed, the motor speed is raised higher by engaging the second clutch rather than engaging the first clutch. That is, in the EV mode, a speed reducing ratio is increased by engaging the second clutch.

In addition, according to the teachings of JP-A-2017-007437, the engine can be started by generating a torque by the motor in a direction to reduce the motor speed while releasing the brake. Consequently, the motor generates an electric power.

That is, according to the teachings of JP-A-2017-007437, the motor generates larger amount of electricity when cranking the engine in the EV mode while engaging the second clutch. However, if the engine is started during propulsion in the EV mode while engaging the second clutch at a high speed, an excessive electrical input may be applied to a battery, and hence the battery may be damaged.

SUMMARY

Aspects of embodiments of the present disclosure have been conceived noting the foregoing technical problems, and it is therefore an object of the present disclosure is to provide a control system for hybrid vehicle that can limit damage on a battery resulting from stating an engine.

The control system according to the embodiment is applied to hybrid vehicle, comprising: a differential mechanism including a first rotary member connected to an engine, a second rotary member connected to a rotary machine, and a third rotary member connected to drive wheels; and a battery that supplies electric power to the rotary machine and that is charged with electric power generated by the rotary machine. The differential mechanism is adapted to establish a first electric vehicle mode in which a ratio of a rotational speed of the drive wheel to a rotational speed of the rotary machine becomes a first predetermined value, and a second electric vehicle mode in which said ratio becomes a second predetermined value that is greater than the first predetermined value. In order to achieve the above-explained objective, according to the embodiment, the control system is provided with a controller that selects an electric vehicle mode from the first electric vehicle mode and the second electric vehicle mode. Specifically, the controller is configured to: crank the engine by operating the rotary machine to generate a torque in such a manner as to reduce a rotational speed of the rotary machine when shifting the operating mode from the first electric vehicle mode or the second electric vehicle mode to a hybrid mode in which the hybrid vehicle is propelled by generating a drive torque by the engine while establishing a reaction torque by the rotary machine; calculate a peak power, that is a maximum value of an input power to the battery from the rotary machine during a period from a commencement of the cranking of the engine to a termination of the cranking of the engine, to start the engine to shift the operating mode from the first electric vehicle mode to the hybrid mode; determine whether or not the peak power is greater than an upper limit input power to the battery; and shift the operating mode from the first electric vehicle mode to the second electric vehicle mode if the peak power is greater than an upper limit input power to the battery.

In a non-limiting embodiment, the controller may be further configured to: determine whether or not a shifting of the operating mode from the first electric vehicle mode to the second electric vehicle mode is restricted; and prevent a shifting the operating mode from the first electric vehicle mode to the second electric vehicle mode if the shifting the operating mode from the first electric vehicle mode to the second electric vehicle mode is restricted, even if the peak power is greater than the upper limit input power to the battery.

In a non-limiting embodiment, the control system may further comprise another rotary machine that is connected to the drive wheels to deliver the torque to the drive wheels. Specifically, another rotary machine may be driven by the electric power supplied from the rotary machine. In addition, the controller may be further configured to: calculate a power generation of the rotary machine by multiplying a torque required to crank the engine by a speed of the rotary machine at a current vehicle speed; calculate a power consumption based on an output torque of said another rotary machine to maintain a required torque; and calculate the peak power by subtracting the power consumption from the power generation.

In a non-limiting embodiment, the control system may further comprise a brake that applies a negative torque to the first rotary member to reduce a rotational speed of the first rotary member. In addition, the controller may be further configured to: establish the first electric vehicle mode and the second electric vehicle mode by applying the negative torque to the first rotary member by the brake; and crank the engine by reducing the negative torque applied to the first rotary member by the brake while operating the rotary machine to generate a torque in such a manner as to reduce a rotational speed of the rotary machine, when shifting the operating mode from the first electric vehicle mode or the second electric vehicle mode to the hybrid mode.

In a non-limiting embodiment, a direction of the torque generated by the rotary machine to crank the engine may be opposite to the reaction torque.

In a non-limiting embodiment, the differential mechanism may include: a first differential mechanism adapted to perform a differential action among a first rotary element as one of said three rotary members, a second rotary element as another one of said three rotary members, and a third rotary element; and a second differential mechanism adapted to perform a differential action among a fourth rotary element as still another one of said three rotary members, a fifth rotary element connected to the third rotary element and a sixth rotary element. In addition, the control system may further comprise: a first engagement device that selectively connects the sixth rotary element to the first rotary element or the second rotary element; and a second engagement device that selectively connects any two of the first rotary element, the second rotary element, and the third rotary element, or connects any two of the fourth rotary element, the fifth rotary element, and the sixth rotary element. Specifically, in the hybrid vehicle, the first electric vehicle mode is established by applying a brake torque to the first rotary member by the brake while connecting any two of the fourth rotary element, the fifth rotary element, and the sixth rotary element by the second engagement device, and the second electric vehicle mode is established by applying a brake torque to the first rotary member by the brake while connecting the sixth rotary element to the first rotary element or the second rotary element by the first engagement device.

In a non-limiting embodiment, the first rotary element may include the first rotary member, the second rotary element may include the second rotary member, and the fourth rotary element may include the third rotary member. In addition, the first engagement device may be adapted to selectively connect the sixth rotary element to the first rotary element, and the second engagement device may be adapted to selectively connect the fourth rotary element to the sixth rotary element.

Thus, according to the embodiment of the present disclosure, the operating mode is shifted from the first electric vehicle mode to the second electric vehicle mode when the peak power to start the engine by the rotary machine is greater than the upper limit input power to the battery. According to the embodiment, therefore, an excessive power input (or current supply) to the battery may be prevented when shifting the operating mode from the electric vehicle mode to the hybrid mode by starting the engine. For this reason, damage on the battery may be limited. In addition, it is not necessary to shift the operating mode from the first electric vehicle mode to the hybrid mode as long as the peak power is smaller than the upper limit input power to the battery. In other words, the hybrid vehicle is allowed to propel in the electric vehicle mode while stopping the engine for a longer time to save the fuel.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 3 is a table showing engagement states of engagement devices and operating conditions of the prime movers in each operating mode;

DETAILED DESCRIPTION OF THE PREFERRED EMBODIMENT(S)

Figure 1:
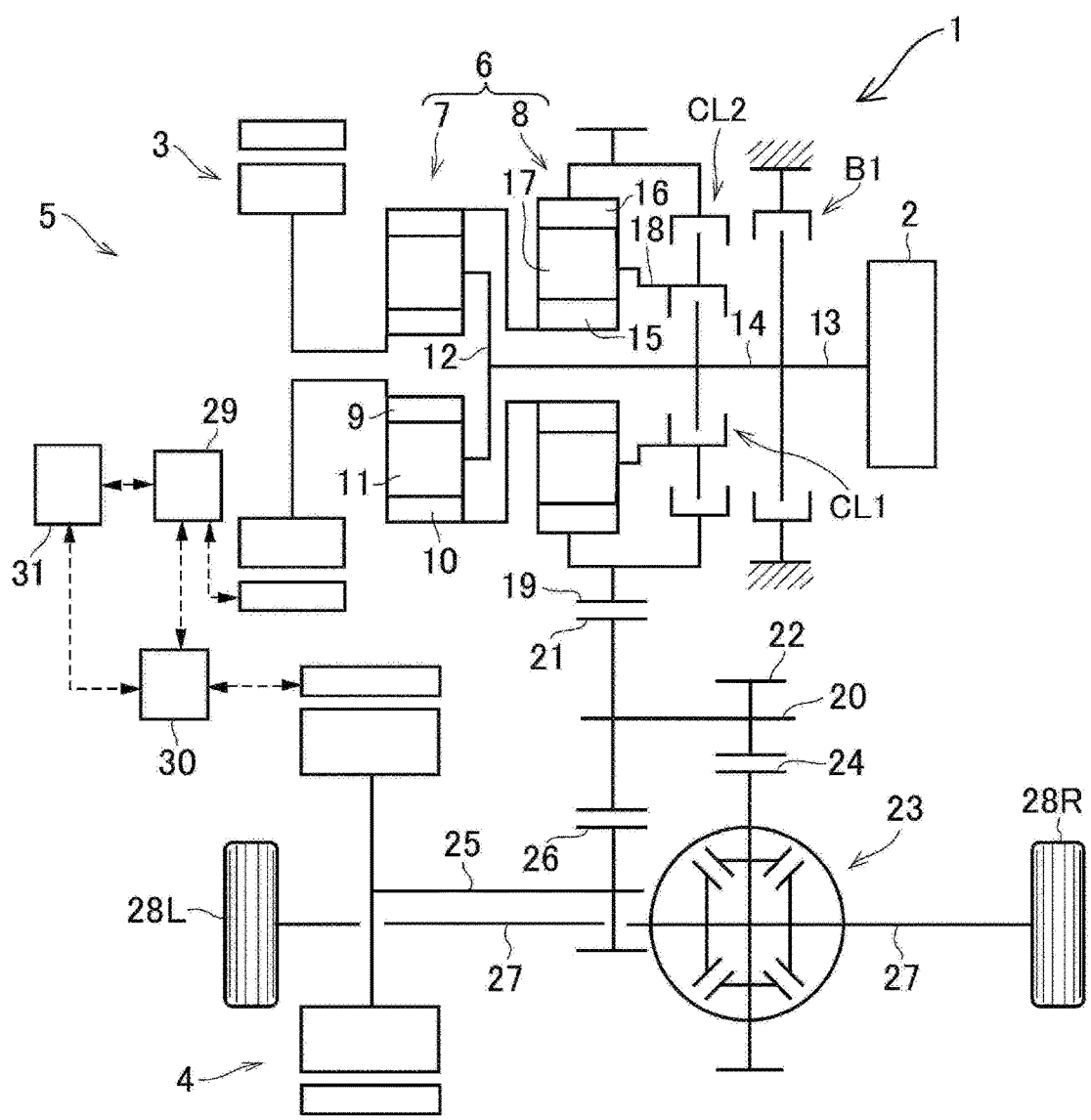
FIG. 1 is a skeleton diagram schematically showing a structure of the drive unit according to at least one embodiment of the present disclosure.

Preferred embodiments of the present application will now be explained with reference to the accompanying drawings. Referring now to FIG. 1 there is shown the first embodiment of the hybrid vehicle according to the present disclosure. The hybrid vehicle 1 comprises a drive unit 5 including an engine 2, a first motor 3 and a second motor 4. Specifically, the first motor 3 is a motor-generator having a generating function (abbreviated as "MG1" in the drawings). In the hybrid vehicle 1 according to the first embodiment, a speed of the engine 2 is controlled by the first motor 3, and the second motor 4 is driven by electric power generated by the first motor 3 to generate a drive force for propelling the vehicle. Likewise, the second motor 4 (abbreviated as "MG2" in the drawings) is also a motor-generator having a generating function. In the hybrid vehicle, accordingly, the first motor 3 serves as a rotary machine, and the second motor 4 serves as another rotary machine.

A power split mechanism 6 as a differential mechanism is connected to the engine 2. The power split mechanism 6 includes a power split section 7 that distributes the engine torque to the first motor 3 side and to an output side, and a transmission section 8 that alters a torque split ratio. In the hybrid vehicle 1, accordingly, the power split section 7 serves as a first differential mechanism, and the transmission section 8 serves as a second differential mechanism.

For example, a single-pinion planetary gear unit adapted to perform differential action among three rotary elements may be used as the power split section 7. Specifically, the power split section 7 comprises: a sun gear 9; a ring gear 10 as an internal gear arranged concentrically with the sun gear 9; pinion gears 11 interposed between the sun gear 9 and the ring gear 10 while being meshed with both gears 9 and 10; and a carrier 12 supporting the pinion gears 11 in a rotatable manner. In the power split section 7, accordingly, the carrier 12 serves as a first rotary element and a first rotary member, the sun gear 9 serves as a second rotary element and a second rotary member, and the ring gear 10 serves as a third rotary element.

An output shaft 13 of the engine 2 is connected to an input shaft 14 of the power split mechanism 6 connected to the carrier 12 so that power of the engine 2 is applied to the carrier 12. Optionally, an additional gear unit may be interposed between the input shaft 14 and the carrier 12, and a damper device and a torque converter may be interposed between the output shaft 13 and the input shaft 14.

The sun gear 9 is connected to the first motor 3. In the embodiment shown in FIG. 1, the power split section 7 and the first motor 3 are arranged concentrically with a rotational center axis of the engine 2, and the first motor 3 is situated on an opposite side of the engine 2 across power split section 7. The transmission section 8 is interposed coaxially between the power split section 7 and the engine 2.

Specifically, the transmission section 8 is a single pinion planetary gear unit comprising: a sun gear 15; a ring gear 16 as an internal gear arranged concentrically with the sun gear 15; pinion gears 17 interposed between the sun gear 15 and the ring gear 16 while being meshed with both gears 15 and 16; and a carrier 18 supporting the pinion gears 17 in a rotatable manner. Thus, the transmission section 8 is also adapted to perform a differential action among the sun gear 15, the ring gear 16, and the carrier 18. In the transmission section 8, the sun gear 15 is connected to the ring gear 10 of the power split section 7, and the ring gear 16 is connected to an output gear 19. Accordingly, the ring gear 16 serves as a third rotary member and a fourth rotary element, the sun gear 15 serves as a fifth rotary element, and the carrier 18 serves as a sixth rotary element.

In order to use the power split section 7 and the transmission section 8 as a complex planetary gear unit, a first clutch CL1 is disposed to selectively connect the carrier 18 of the transmission section 8 with the carrier 12 of the power split section 7. To this end, for example, a wet-type multiple plate clutch or a dog clutch may be used as the first clutch CL1. Thus, in the embodiment shown in FIG. 1, the power split section 7 is connected to the transmission section 8 to serve as a complex planetary gear unit by bringing the first clutch CL1 into engagement. In the complex planetary gear unit thus formed, the carrier 12 of the power split section 7 is connected to the carrier 18 of the transmission section 8 to serve as an input element, the sun gear 9 of the power split section 7 serves as a reaction element, and the ring gear 16 of the transmission section 8 serves as an output element.

A second clutch CL2 is disposed to rotate the rotary elements of the transmission section 8 integrally. For example, a friction clutch and a dog clutch may also be used as the second clutch CL2 to selectively connect the carrier 18 to the ring gear 16 or the sun gear 15, or to connect the sun gear 15 to the ring gear 16. In the embodiment shown in FIG. 1, specifically, the second clutch CL2 is adapted to connect the carrier 18 to the ring gear 16 to rotate the rotary elements of the transmission section 8 integrally. The first clutch CL1 and the second clutch CL2 are arranged coaxially with the engine 2, the power split section 7, and the transmission section 8 on the opposite side of the power split section 7 across the transmission section 8. The first clutch CL1 and the second clutch CL2 may be arranged not only in parallel to each other in a radial direction but also in tandem in an axial direction. In the embodiment shown in FIG. 1, the first clutch CL1 and the second clutch CL2 are arranged radially parallel to each other and hence an axial length of the drive unit can be shortened. In addition, since a width of the drive unit will not be widened by the clutches CL1 and CL2, the number of friction plates of the frictional clutch can be reduced.

A counter shaft 20 extends parallel to a common rotational axis of the engine 2, the power split section 7, and the transmission section 8. A driven gear 21 is fitted onto one end of the counter shaft 20 to be meshed with the output gear 19, and a drive gear 22 is fitted onto the other end of the counter shaft 20 to be meshed with a ring gear 24 of a differential gear unit 23 as a final reduction. The driven gear 21 is also meshed with a drive gear 26 fitted onto a rotor shaft 25 of the second motor 4 so that power or torque of the second motor 4 is synthesized with power or torque of the output gear 19 at the driven gear 21 to be distributed from the differential gear unit 23 to front wheels 28R and 28L via each drive shaft 27.

In order to selectively stop a rotation of the output shaft 13 or the input shaft 14 for the purpose of delivering the drive torque generated by the first motor 3 to the front wheels 28R and 28L, a brake B1 is arranged in the drive unit 5. For example, a frictional engagement device or a dog brake may be used as the first brake B1. Specifically, the carrier 12 of the power split section 7 and the carrier 18 of the transmission section 8 are allowed to serve as reaction elements, and the sun gear 9 of the power split section 7 is allowed to serve as an input element by applying the first brake B1 to halt the output shaft 13 or the input shaft 14. To this end, the first brake B1 may be adapted to stop the rotation of the output shaft 13 or the input shaft 14 not only completely but also incompletely to apply a reaction torque to those shafts. Alternatively, a one-way clutch may be used instead of the first brake B1 to restrict a reverse rotation of the output shaft 13 or the input shaft 14.

As shown in FIG. 1, a first power control system 29 is connected to the first motor 3, a second power control system 30 is connected to the second motor 4. Each of the first power control system 29 and the second power control system 30 individually includes an inverter and a converter. The first power control system 29 and the second power control system 30 are connected to each other, and also connected individually to a battery 31 including a lithium ion battery and a capacitor. For example, when the first motor 3 is operated as a generator while establishing a reaction torque, an electric power generated by the first motor 3 may be supplied directly to the second motor 4 without passing through the battery 31.

Figure 2:
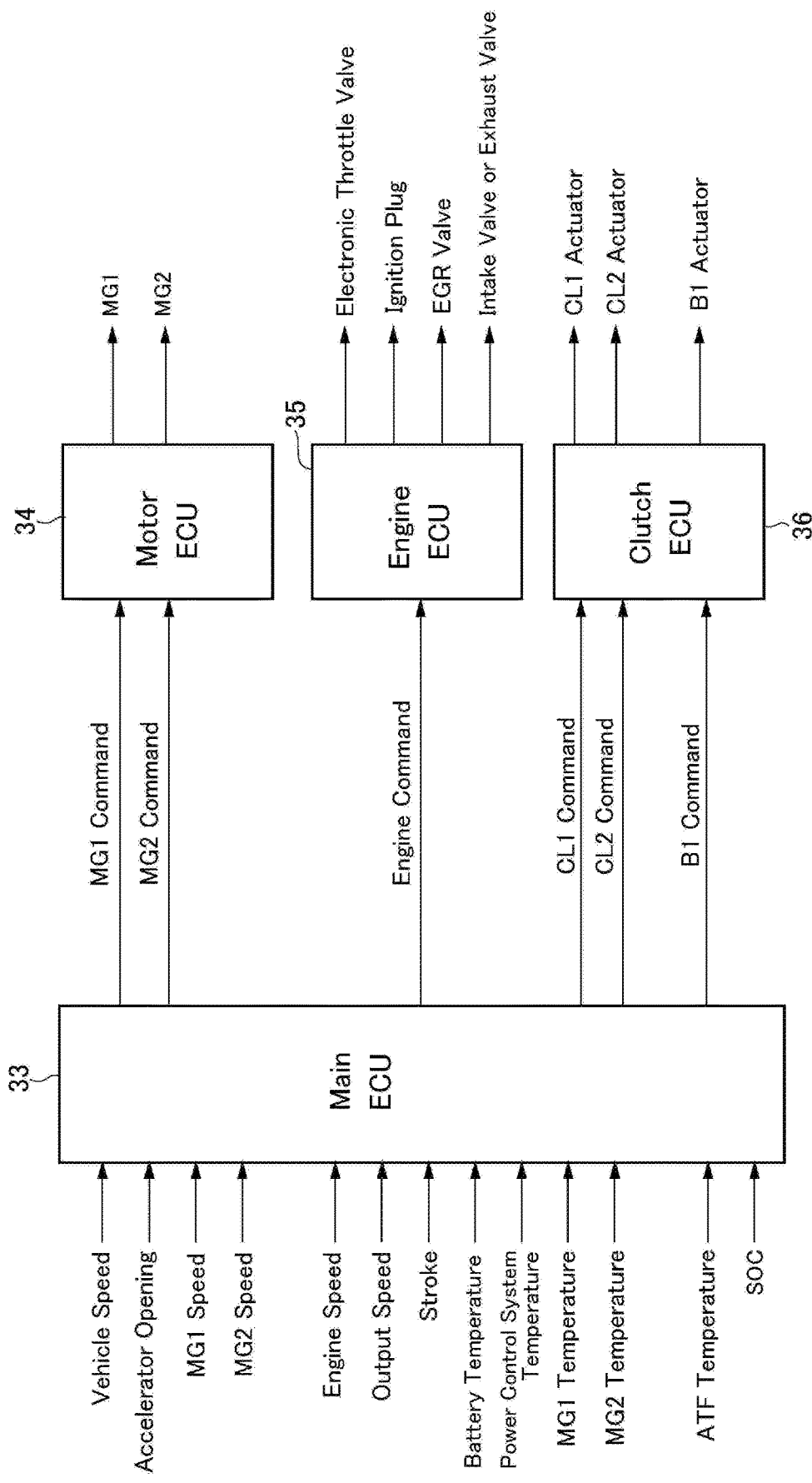
FIG. 2 is a block diagram showing a structure of an electronic control unit.

In order to control the first power control system 29, the second power control system 30, the engine 2, the clutches CL1, CL2 and the brake B1, the hybrid vehicle 1 is provided with an electronic control unit (to be abbreviated as the "ECU" hereinafter) 32 as a controller. The ECU 32 is composed mainly of a microcomputer, and as shown in FIG. 2, the ECU 32 comprises a main ECU 33, a motor ECU 34

(abbreviated as "MG-ECU" in the drawings), an engine ECU 35 and a clutch ECU 36.

The main ECU 33 is configured to execute a calculation based on incident data from sensors as well as maps and formulas installed in advance, and transmits a calculation result to the motor ECU 34, the engine ECU 35, and the clutch ECU 36 in the form of command signal. For example, the main ECU 33 receives data about; a vehicle speed; an accelerator position; a speed of the first motor 3; a speed of the second motor 4; a speed of the output shaft 13 of the engine 2; an output speed such as a speed of the ring gear 16 of the transmission section 8 or the counter shaft 20; strokes of pistons of the clutches CL1, CL2, and the brakes B1; a temperature of the battery 31; temperature of the power control systems 29, 30; a temperature of the first motor 3; a temperature of the second motor 4; a temperature of oil (i.e., ATF) lubricating the power split section 7 and the transmission section 8; and a state of charge (to be abbreviated as the "SOC" hereinafter) level of the battery 31.

Specifically, command signals of output torques and speeds of the first motor 3 and the second motor 4 are transmitted from the main ECU 33 to the motor ECU 34. Likewise, command signal of an output torque and a speed of the engine 2 are transmitted from the main ECU 33 to the engine ECU 35. Further, command signals of torque transmitting capacities (including "0") of the clutches CL1, CL2 and the brake B1 are transmitted from the main ECU 33 to the clutch ECU 36.

The motor ECU 34 calculates current values applied to the first motor 3 and the second motor 4 based on the data transmitted from the main ECU 33, and transmits calculation results to the motors 3, 4 in the form of command signals. In the hybrid vehicle 1 according to the embodiment, an AC motor is used individually as the first motor 3 and the second motor 4. In order to control the AC motor, the command signal transmitted from the motor ECU 34 includes command signals for controlling a frequency of a current generated by the inverter and a voltage value boosted by the converter.

The engine ECU 35 calculates current values to control opening degrees of an electronic throttle valve, an EGR (Exhaust Gas Restriction) valve, an intake valve, and an exhaust valve, and to activate an ignition plug, based on the data transmitted from the main ECU 33, and transmits calculation results to the valves and the plug in the form of command signals. Thus, the engine ECU 35 transmits command signals for controlling a power, an output torque and a speed of the engine 2.

The clutch ECU 36 calculates current values supplied to actuators controlling engagement pressures of the clutches CL1, CL2 and the brake B1 based on the data transmitted from the main ECU 33, and transmits calculation results to the actuators in the form of command signals.

In the hybrid vehicle 1 according to the embodiment, an operating mode may be selected from a hybrid mode (to be abbreviated as the "HV mode" hereinafter) in which the hybrid vehicle 1 is propelled by a drive torque generated by the engine 2, and an electric vehicle mode (to be abbreviated as the "EV mode" hereinafter) in which the hybrid vehicle 1 is propelled by drive torques generated by the first motor 3 and the second motor 4 without using the engine 2. The HV mode may be selected from a hybrid-low mode (to be abbreviated as the "HV-Lo mode" hereinafter), a hybrid-high mode (to be abbreviated as the "HV-Hi mode" hereinafter), and a fixed mode. Specifically, in the HV-Lo mode, a rotational speed of the engine 2 (i.e., a rotational speed of the input shaft 14) is increased higher than a rotational speed of the ring gear 16 of the transmission section 8 when a rotational speed of the first motor 3 is reduced substantially to zero. In turn, in the HV-Hi mode, a rotational speed of the engine 2 is reduced lower than a rotational speed of the ring gear 16 of the transmission section 8 when a rotational speed of the first motor 3 is reduced substantially to zero. Further, in the fixed mode, the engine 2 and the ring gear 16 of the transmission section 8 are always rotated at a substantially same speeds.

The EV mode may be selected from a dual-motor mode in which both of the first motor 3 and the second motor 4 generate drive torques to propel the hybrid vehicle 1, and a single-motor mode in which only the second motor 4 generates a drive torque to propel the hybrid vehicle 1. Further, the dual-motor mode may be selected from an electric vehicle-low mode (to be abbreviated as the "EV-Lo mode" hereinafter) in which a torque of the first motor 3 is multiplied by a relatively larger factor, and an electric vehicle-high mode (to be abbreviated as the "EV-Hi mode" hereinafter) in which a torque of the first motor 3 is multiplied by a relatively smaller factor. Thus, the second clutch CL2 to establish the EV-Hi mode and the first clutch CL1 to establish the EV-Lo mode are arranged in the differential mechanism (i.e., the transmission section 8) connected to the output gear 19.

In the single-motor mode, the hybrid vehicle 1 is powered only by the second motor 4, while engaging the first clutch CL1, while engaging the second clutch CL2, or while disengaging both of the first clutch CL1 and the second clutch CL2.

FIG. 3 shows engagement states of the first clutch CL1, the second clutch CL2, and the brake B1, and operating conditions of the first motor 3, the second motor 4, and the engine 2 in each operating mode. In FIG. 3, "●" represents that the engagement device is in engagement, "-" represents the engagement device is in disengagement, "G" represents that the motor serves mainly as a generator, "M" represents that the motor serves mainly as a motor, blank represents that the motor serves as neither a motor nor a generator or that the motor is not involved in propulsion of the hybrid vehicle 1, "ON" represents that the engine 2 generates a drive torque, and "OFF" represents that the engine 2 does not generate a drive torque. During propulsion in the single-motor mode, an output power of the engine 2 may be translated entirely into an electric energy by operating the first motor 3 as a generator. In this case, since the engine 2 does not function as a prime mover, the status of the engine 2 is indicated as "OFF" in FIG. 3.

Rotational speeds of the rotary elements of the power split mechanism 6, and directions of torques of the engine 2, the first motor 3, and the second motor 4 in each operating mode are indicated in FIGS. 4 to 9. In the nomographic diagrams shown in FIGS. 4 to 9, distances among the vertical lines represents a gear ratio of the power split mechanism 6, a vertical distance on the vertical line from the horizontal base line represents a rotational speed of the rotary member, an orientation of the arrow represents a direction of the torque, and a length of the arrow represents a magnitude of the torque.

Figure 4:
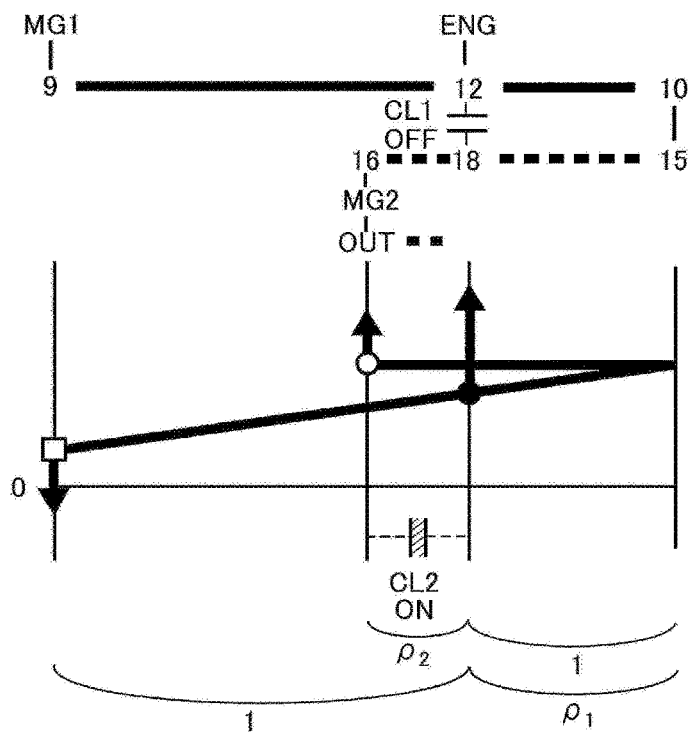
FIG. 4 is a nomographic diagram showing a situation in a HV-high mode.
Figure 5:
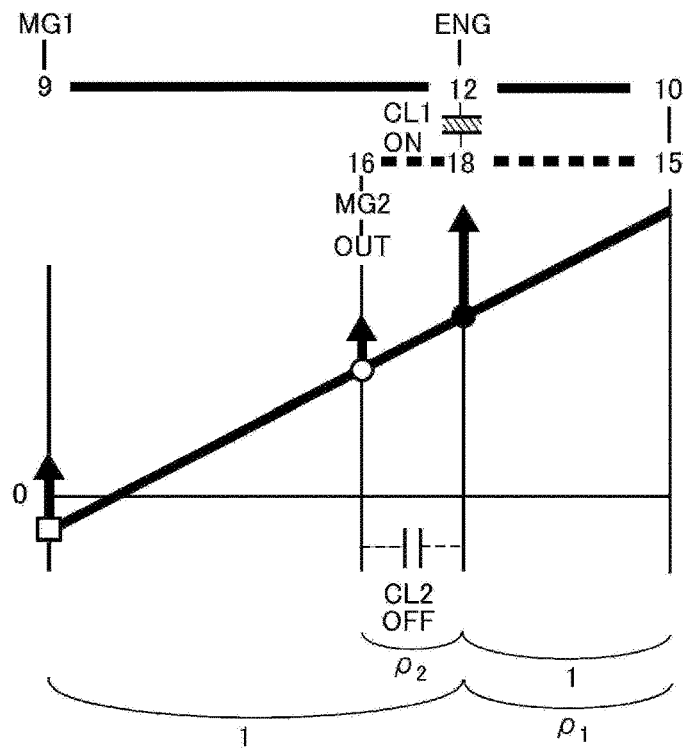
FIG. 5 is a nomographic diagram showing a situation in a HV-low mode.

As indicated in FIGS. 4 and 5, in the HV-Hi mode and the HV-Lo mode, any one of the first clutch CL1 and the second clutch CL2 is engaged, and the engine 2 generates a drive torque while establishing a reaction torque by the first motor 3. In this situation, a rotational speed of the first motor 3 is controlled in such a manner as to optimize a total energy efficiency in the drive unit 5 including a fuel efficiency of the engine 2 and a driving efficiency of the first motor 3.

Specifically, the total energy efficiency in the drive unit 5 may be calculated by dividing a total energy consumption by a power to rotate the front wheels 28R and 28L. A rotational speed of the first motor 3 may be varied continuously, and the rotational speed of the engine 2 is governed by the rotational speed of the first motor 3 and a vehicle speed. That is, the power split mechanism 6 may serve as a continuously variable transmission.

As a result of establishing a reaction torque by the first motor 3, the first motor 3 may serve as a generator. In this situation, therefore, a power of the engine 2 is partially translated into an electric energy, and the remaining power of the engine 2 is delivered to the ring gear 16 of the transmission section 8. Specifically, the reaction torque established by the first motor 3 is governed by a split ratio of the torque delivered from the engine 2 to the first motor 3 side through the power split mechanism 6. Such split ratio between the torque delivered from the engine 2 to the first motor 3 side through the power split mechanism 6 and the torque delivered from the engine 2 to the ring gear 16 differs between the HV-Lo mode and the HV-Hi mode.

Given that the torque delivered to the first motor 3 side is "1", a ratio of the torque applied to the ring gear 16 in the HV-Lo mode may be expressed as "$1/(\rho1 \cdot \rho2)$", and a ratio of the torque applied to the ring gear 16 in the HV-Hi mode may be expressed as "$1/(\rho1)$". In the above-expressed expressions, "$\rho1$" is a gear ratio of the power split section 7 (i.e., a ratio between teeth number of the ring gear 10 and teeth number of the sun gear 9), and "$\rho2$" is a gear ratio of the transmission section 8 (i.e., a ratio between teeth number of the ring gear 16 and teeth number of the sun gear 15). Specifically, "$\rho1$" and "$\rho2$" are individually smaller than "1". That is, in the HV-Lo mode, a ratio of the torque delivered to the ring gear 16 is increased in comparison with that in the HV-Hi mode.

In the HV mode, the electric power generated by the first motor 3 is supplied to the second motor 4, and in addition, the electric power accumulated in the battery 31 is also supplied to the second motor 4 as necessary.

Figure 6:
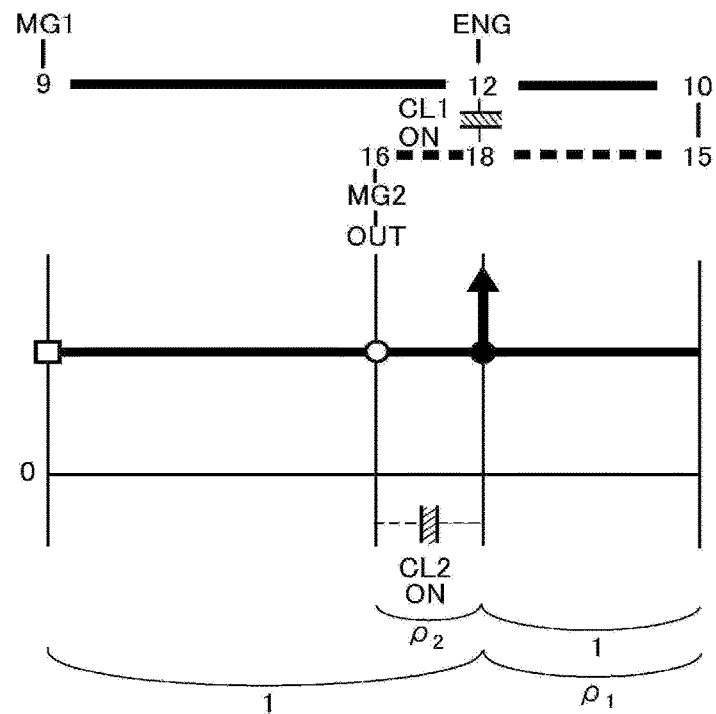
FIG. 6 is a nomographic diagram showing a situation in a fixed mode.

In the fixed mode, as indicated in FIG. 6, both of the first clutch CL1 and the second clutch CL2 are engaged so that all of the rotary elements in the power split mechanism 6 are rotated at a same speed. In other words, the output power of the engine 2 will not be translated into an electric energy by the first motor 3 and the second motor 4. For this reason, a power loss associated with such energy conversion will not be caused in the fixed mode and hence power transmission efficiency can be improved.

Figure 7:
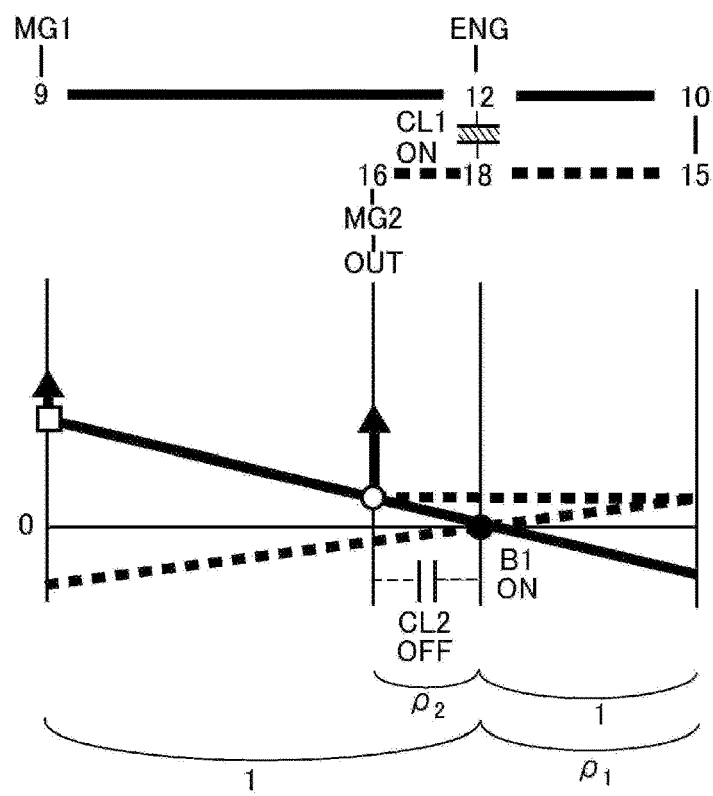
FIG. 7 is a nomographic diagram showing a situation in an EV-Lo mode.
Figure 8:
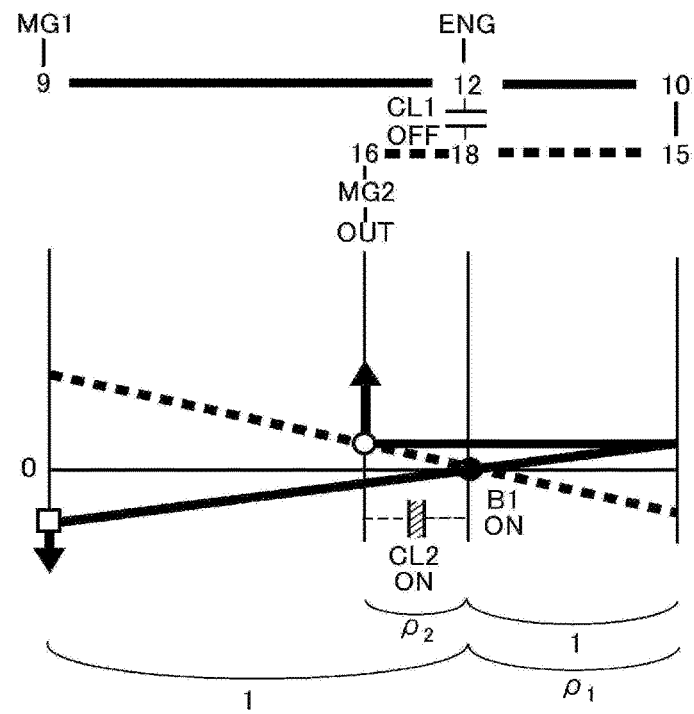
FIG. 8 is a nomographic diagram showing a situation in the EV-Hi mode.

As indicated in FIG. 7, in the EV-Hi mode, the hybrid vehicle 1 is propelled by drive torques generated by the first motor 3 and the second motor 4 while engaging the brake B1 and the second clutch CL2. In this case, the brake B1 establishes a reaction torque or a negative torque to restrict a rotation of the output shaft 13 or the carrier 12. In the EV-Hi mode, the first motor 3 is rotated in the opposite direction (i.e., in a reverse direction) to the rotational direction of the engine 2 in the HV mode, while generating torque in a direction to increase a rotational speed. As indicated in FIG. 8, in the EV-Lo mode, the hybrid vehicle 1 is propelled by the drive torques generated by the first motor 3 and the second motor 4 while engaging the brake B1 and the first clutch CL1. In this case, the brake B1 also establishes a reaction torque or a negative torque to restrict a rotation of the output shaft 13 or the carrier 12. In the EV-Lo mode, the first motor 3 is rotated in the forward direction while generating torque in a direction to increase a rotational speed.

In the EV-Lo mode, a ratio of a rotational speed of the ring gear 16 of the transmission section 8 to a rotational speed of the first motor 3 is reduced smaller than that in the EV-Hi mode. That is, in the EV-Lo mode, the rotational speed of the first motor 3 at a predetermined speed is increased higher than that in the EV High mode. In other words, a speed reducing ratio in the EV-Lo mode is greater than that in the EV-Hi mode. In the EV-Lo mode, therefore, torque of the first motor 3 is delivered to the drive wheels 28R and 28L while being multiplied in comparison with the EV-Hi mode. In FIG. 7, the dashed-line represents an operating condition in the EV-Lo mode, and in FIG. 8, the dashed-line represents an operating condition in the EV-Hi mode. Accordingly, the above-mentioned ratio of the rotational speed in the EV-Lo mode corresponds to a "first predetermined value", and the above-mentioned ratio of the rotational speed in the EV-HI mode corresponds to a "second predetermined value".

Figure 9:
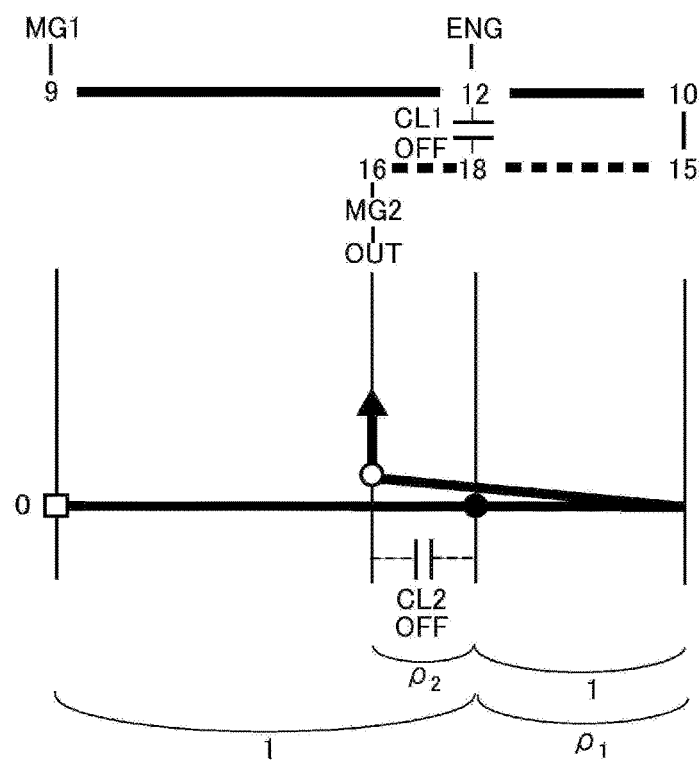
FIG. 9 is a nomographic diagram showing a situation in a single mode.

As indicated in FIG. 9, in the single-motor mode, only the second motor 4 generates a drive torque, and both of the clutch CL1 and the second clutch CL2 are disengaged. In the single-motor mode, therefore, all of the rotary elements on the power split mechanism 6 are stopped. For this reason, the engine 2 and the first motor 3 will not be rotated passively, and hence the power loss can be reduced.

In the hybrid vehicle 1, the operating mode of is selected on the basis of a vehicle speed, a required drive force and so on. According to the embodiment, a selection pattern of the operating mode may be selected from a CS (i.e., Charge Sustaining) mode in which the operating mode is selected in such a manner as to maintain the SOC level of the battery 31 as far as possible, and a CD (i.e., Charge Depleting) mode in which the operating mode is selected in such a manner as to propel the hybrid vehicle 1 while consuming the electric power accumulated in the battery 31. Specifically, the CS mode is selected when the SOC level of the battery 31 is relatively low, and the CD mode is selected when the SOC level of the battery 31 is relatively high.

Figure 10:
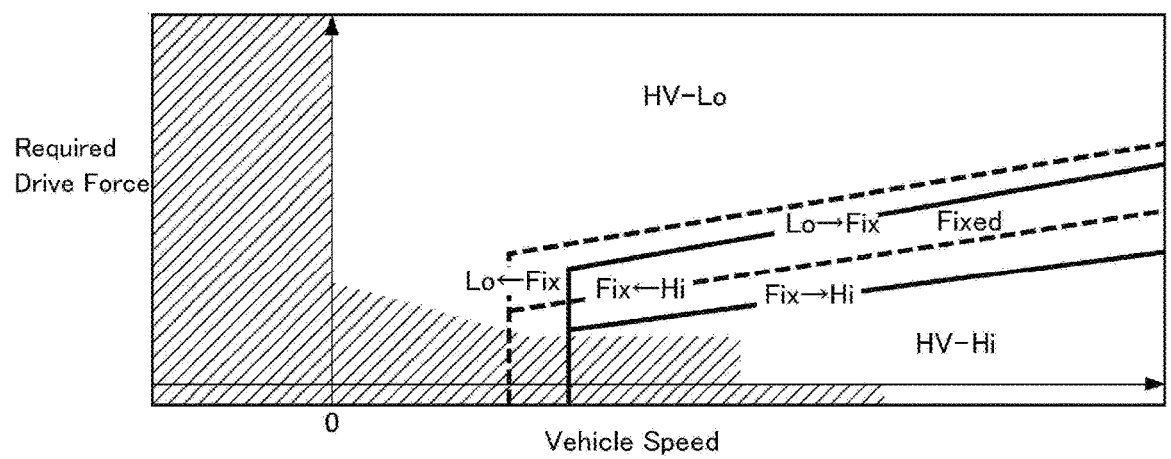
FIG. 10 is shows a map for determining an operating mode during propulsion in a CS mode.

FIG. 10 shows an example of a map used to select the operating mode during propulsion in the CS mode. In FIG. 10, the vertical axis represents a required drive force, and the horizontal axis represents a vehicle speed. In order to select the operating mode of the hybrid vehicle 1, the vehicle speed may be detected by a vehicle speed sensor, and the required drive force may be estimated based on an accelerator position detected by an accelerator sensor.

In FIG. 10, the hatched area is an area where the single-motor mode is selected. In the CS mode, the single-motor mode is selected when the hybrid vehicle 1 is propelled in a reverse direction irrespective of the required drive force, and when the hybrid vehicle 1 is propelled in a forward direction and the required drive force is small (or when decelerating). Such area where the single-motor mode is selected is determined based on specifications of the second motor 4.

During forward propulsion in the CS mode, the HV mode is selected when the large drive force is required. In the HV mode, the drive force may be generated from a low speed range to a high speed range. When the SOC level falls close to a lower limit level, therefore, the HV mode may be selected even if an operating point governed by the required drive force and the vehicle speed falls within the hatched area.

As described, the HV mode may be selected from the HV-Lo mode, the HV-Hi mode, and the fixed mode. In the CS mode, specifically, the HV-Lo mode is selected when the vehicle speed is relatively low and the required drive force is relatively large, the HV-Hi mode is selected when the vehicle speed is relatively high and the required drive force is relatively small, and the fixed mode is selected when the operating point falls between an area where the HV-Lo mode is selected and an area where the HV-Hi mode is selected.

In the CS mode, the operating mode is shifted from the fixed mode to the HV-Lo mode when the operating point is shifted across the "Lo←Fix" line from right to left, or when the operating point is shifted across the "Lo←Fix" line upwardly from the bottom. By contrast, the operating mode is shifted from the HV-Lo mode to the fixed mode when the operating point is shifted across the "Lo→Fix" line from left to right, or when the operating point is shifted across the "Lo→Fix" line downwardly from the top. Likewise, the operating mode is shifted from the HV-Hi mode to the fixed mode when the operating point is shifted across the "Fix←Hi" line from right to left, or when the operating point is shifted across the "Fix←Hi" line upwardly from the bottom. By contrast, the operating mode is shifted from the fixed mode to the HV-Hi mode when the operating point is shifted across the "Fix→Hi" line from left to right, or when the operating point is shifted across the "Fix→Hi" line downwardly from the top.

Figure 11:
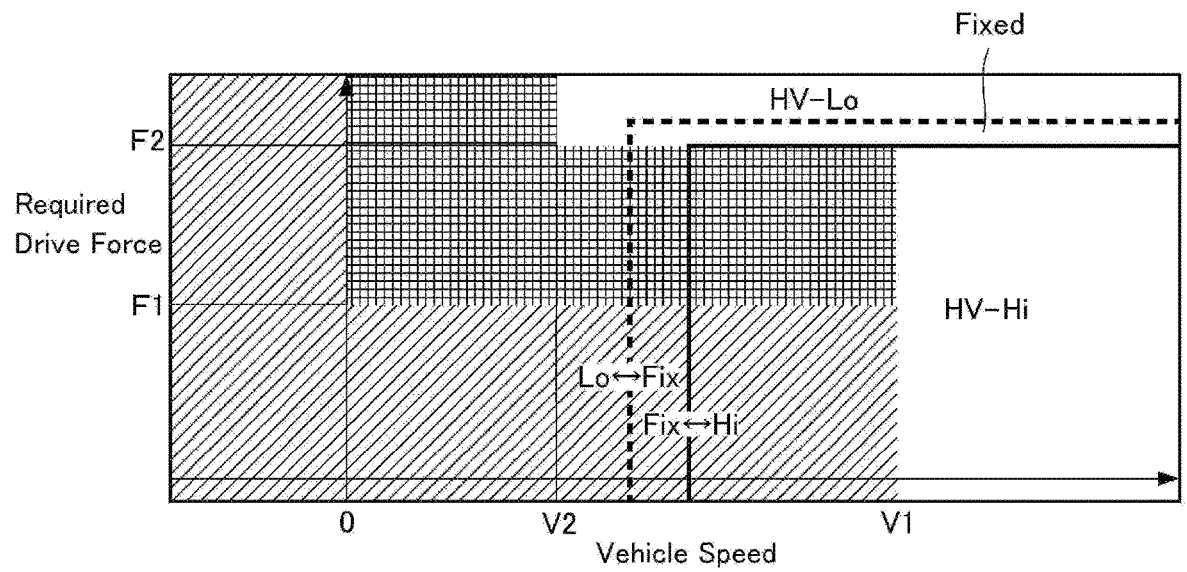
FIG. 11 shows a map for determining an operating mode during propulsion in a CD mode.

FIG. 11 shows an example of a map used to select the operating mode during propulsion in the CD mode. In FIG. 11, the vertical axis also represents the required drive force, and the horizontal axis also represents the vehicle speed.

In FIG. 11 the hatched area is also an area where the single-motor mode is selected. In the CD mode, the single-motor mode is selected when the hybrid vehicle 1 is propelled in a reverse direction irrespective of the required drive force, and when the hybrid vehicle 1 is propelled in a forward direction and the required drive force is smaller than a first threshold force value F1 (or when decelerating). Such area where the single-motor mode is selected is also determined based on specifications of the second motor 4.

Figure 12:
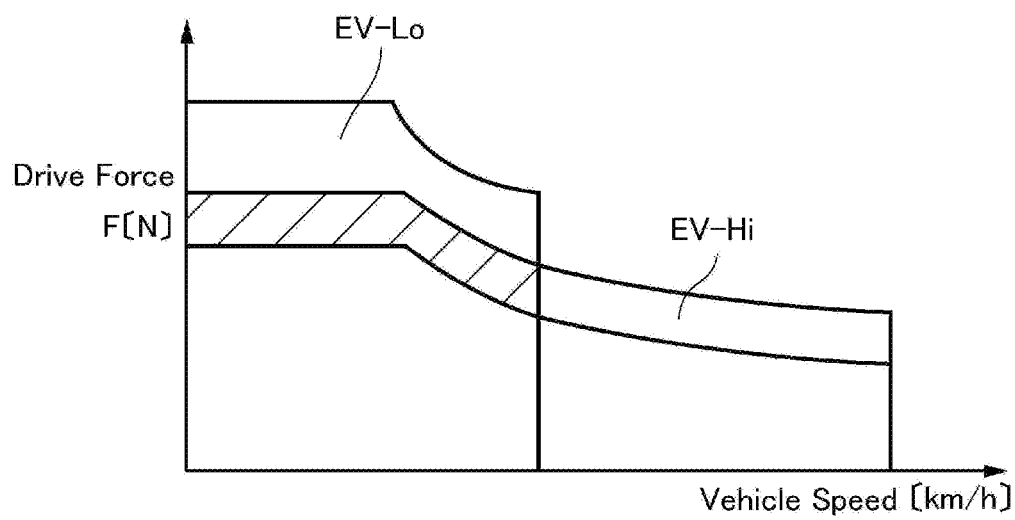
FIG. 12 shows a map for determining an available region in each of the EV-Hi mode and the EV-Lo mode.

During forward propulsion in the CD mode, the dual-motor mode is selected when the drive force larger than the first threshold force value F1 is required. As described, in the dual-motor mode, not only the EV-Hi mode but also the EV-Lo mode is available, and as shown in FIG. 12, operating ranges of the EV-Hi mode and the EV-Lo mode are different from each other. In FIG. 12, the vertical axis represents the drive force, and the horizontal axis represents the vehicle speed. As shown in FIG. 12, in the EV-Hi mode, the drive force can be generated to a relatively higher speed in comparison with the EV-Lo mode. This is because the speed reducing ratio is greater in the EV-Lo mode so that the rotational speed of the first motor 3 with respect to the vehicle speed is increased. In the EV-Lo mode, therefore, rotational speeds of the rotary elements of the power split mechanism 6 and the first motor 3 reach the upper limit speed at a relatively low speed. However, the speed reducing ratio is greater in the EV-Lo mode so that the torque multiplying rate of maximum torque of the first motor 3 is greater in the EV-Lo mode. For this reason, an available drive force is greater in the EV-Lo mode.

In FIG. 12, the hatched area is a region where the required drive force can be generated in any of the EV-Hi mode and the EV-Lo mode. In the dual-motor mode, therefore, it is preferable to select the operating mode possible to reduce electric power consumptions of the first motor 3 and the second motor 4 when the operating point falls within the hatched area. In other words, it is preferable to select the operating mode in such a manner as to operate the first motor 3 and the second motor 4 more efficiently. In FIG. 12, a lower limit value of the hatched area is an upper limit value of a region where the single-motor mode is selected.

In the CD mode, the HV mode is selected when the vehicle speed is higher than a first threshold speed V1, or when the vehicle speed is higher than a second threshold speed V2 and the required drive force is greater than a second threshold force value F2. As described, the drive force may be generated from the low speed range to the high speed range in the HV mode. When the SOC level falls close to the lower limit level, therefore, the HV mode may be selected even if the operating point falls within the areas where the single-motor mode and the dual-motor mode are selected.

In the CD mode, the HV-Lo mode is also selected when the vehicle speed is relatively low and the required drive force is relatively large, the HV-Hi mode is also selected when the vehicle speed is relatively high and the required drive force is relatively small, and the fixed mode is also selected when the operating point falls between the area where the HV-Lo mode is selected and the area where the HV-Hi mode is selected.

In the CD mode, the operating mode is shifted between the fixed mode and the HV-Lo mode when the operating point is shifted across the "Lo↔Fix" line shown in FIG. 11. Likewise, the operating mode is shifted from the HV-Hi mode and the fixed mode when the operating point is shifted across the "Fix↔Hi" shown in FIG. 11.

In the maps shown in FIGS. 10 and 11, the areas of each of the operating mode and the lines defining the areas may be altered depending on temperatures of the members of the drive unit 5, the battery 31, the power control systems 29, 30 and the SOC level of the battery 31.

When a condition to shift the operating mode to the HV mode is satisfied during propulsion in the EV-Hi mode or the EV-Lo mode, for example, when the SOC level of the battery 31 falls close to the lower limit level during propulsion in the EV-Hi mode or the EV-Lo mode, the engine 2 is started by the torque of the first motor 3. In order to start the engine 2, specifically, the brake B1 is disengaged to allow a rotation of the output shaft 13. Then, the first motor 3 generates torque to crank the engine 2 while adjusting a target speed of the first motor 3 to a speed calculated based on a starting speed of the engine 2 and a gear ratio. To this end, the first motor 3 generates the torque in a direction opposite to the drive torque of the first motor 3 in the EV-Hi mode or the EV-Lo mode.

For example, when the engine 2 is required to be started during propulsion in the EV-Hi mode at a low speed, the first motor 3 generates torque in a direction to gradually reduce a rotational speed of the first motor 3. Eventually, a rotational direction of the first motor 3 is switched to the forward direction, and the rotational speed of the first motor 3 is increased gradually in the forward direction. Likewise, when the engine 2 is required to be started during propulsion in the EV-Lo mode at a low speed, the first motor 3 also generates torque in a direction to gradually reduce a rotational speed of the first motor 3. Eventually, a rotational direction of the first motor 3 is switched to the reverse direction, and the rotational speed of the first motor 3 is increased gradually in the reverse direction. That is, in the case of starting the engine 2 during propulsion at a low speed in the EV mode, the first motor 3 serves as a generator immediately after starting the engine 2, and serves as a motor after the rotational direction of the first motor 3 is switched.

By contrast, if the vehicle speed is high when starting the engine 2 during propulsion in any of the EV-Hi mode and the EV-Lo mode, the rotational direction of the first motor 3 will not be switched. That is, the first motor 3 serves as a generator throughout the execution of the cranking of the engine 2. Here, an electrical loss is not taking into account in the foregoing explanations. However, during generating torque by the first motor 3 in a direction to reduce the rotational speed of the first motor 3, the first motor 3 will not serve as a generator if the rotational speed of the first motor 3 is extremely low. That is, electricity is consumed.

When the first motor serves as a generator during cranking the engine 2, the electricity generated by the first motor 3 is supplied to the battery 31. By contrast, when the first motor serves as a motor during cranking the engine 2, the electricity is supplied to the first motor 3 from the battery 31. During cranking of the engine 2, a brake torque is applied individually to the drive wheels 28R and 28L, therefore, the drive force of the second motor 4 is increased to reduce a change in the drive force. In this situation, even if the first motor 3 serves as a generator, a generation amount is small. Therefore, if the power consumption of the second motor 4 is greater than the generation amount of the first motor 3, the electricity will not be supplied to the battery 31. The generation amount of the first motor 3 and the power consumption may be calculated by multiplying a rotational speed of the first motor 3 by the torque.

As described, the ratio of a rotational speed of the ring gear 16 of the transmission section 8 to a rotational speed of the first motor 3 is greater in the EV-Lo mode, in comparison with that in the EV-Hi mode. That is, an absolute value of a rotational speed of the first motor 3 at a predetermined speed is higher in the EV-Lo mode in comparison with that in the EV-Hi mode. For this reason, an inertial energy of the first motor 3 is greater in the EV-Lo mode in comparison with that in the EV-Hi mode. For example, in a case that the rotational direction of the first motor 3 is not switched during the cranking of the engine 2 at a high speed, the first motor 3 generates a larger amount of electricity in the EV-Lo mode during cranking. Here, the rotational speed of the first motor 3 at a commencement of the cranking is higher than that at a termination of the cranking. Likewise, a required torque of the first motor 3 is greater at a commencement of the cranking, and reduced when the rotational speed of the engine 2 reaches a predetermined speed. For this reason, in principle, an amount generation and an amount of consumption of the first motor 3 are largest at a beginning of the cranking.

Figure 13:
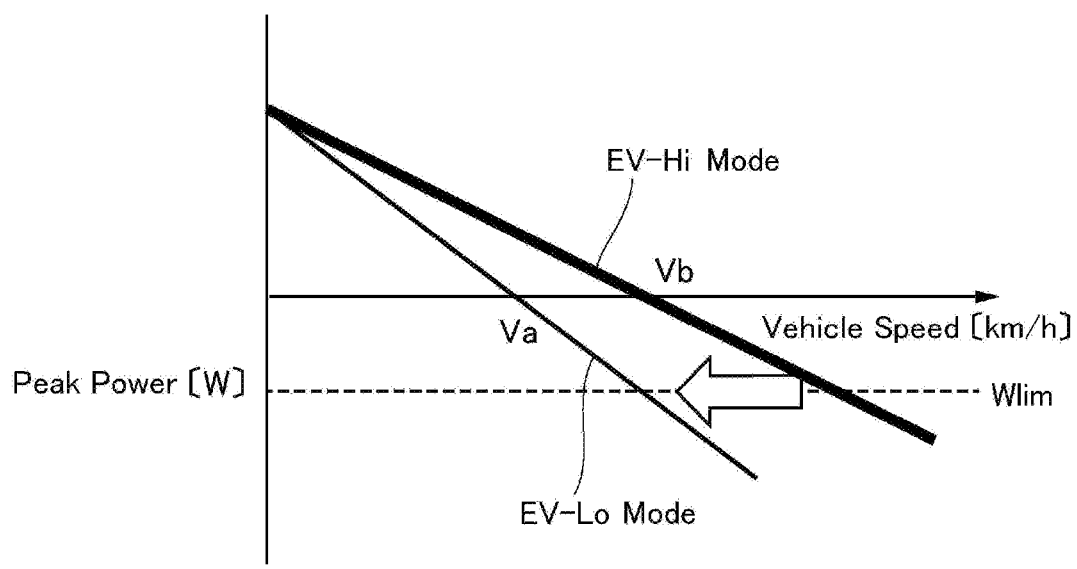
FIG. 13 is a graph indicating a relation between a maximum electrical input or output a maximum electrical to/from a battery and a vehicle speed in a process of cranking the engine.

FIG. 13 indicates a relation between a peak power (i.e., maximum electricity) W supplied to the battery 31 or outputted from the battery 31 during cranking the engine 2 and a vehicle speed V. Specifically, given that the first motor 3 serves not only as a motor but also as a generator, a greater value out of: an absolute value of a maximum input power Win to the battery 31; and an absolute value of a maximum output power Wout from the battery 31, is employed as the peak value W. In FIG. 13, the vertical axis represents the peak power W, and the horizontal axis represents the vehicle speed V. In addition, in FIG. 13, the maximum output power Wout of the case in which the first motor 3 serves as a motor is indicated as a positive value, and the maximum input power Win of the case in which the first motor 3 serves as a generator is indicated as a negative value.

As indicated in FIG. 13, the peak power W becomes positive in both of the EV-Lo mode and the EV-Hi mode when the vehicle speed V is lower than a first predetermined speed Va. When the vehicle speed V falls between the first predetermined speed Va and a second predetermined speed Vb, the peak power W becomes negative in the EV-Lo mode, and becomes positive in the EV-Hi mode. When the vehicle speed V is higher than the second predetermined speed Vb the peak power W becomes negative in both of the EV-Lo mode and the EV-Hi mode, and the peak power W in the EV-Lo mode is greater than the peak power W in the EV-Hi mode.

If a temperature of the battery 31 is low, an internal resistance of the battery 31 is increased. In this situation, if a large current is applied to the battery 31, a voltage of the battery 31 may exceed an upper limit value. A voltage of the battery 31 may also exceed an upper limit value if a large current is applied to the battery 31 when an SOC level is high and a closed circuit voltage is high. In addition, when a temperature of the first power control system 29 is high, the temperature of the first power control system 29 may exceed an upper limit value if a large current flows between the battery 31 and the first motor 3. Therefore, as indicated by the dashed-line in FIG. 13, an upper limit input power Wlim to the battery 31 is set in accordance with the conditions of the battery 31 and the first power control system 29.

Figure 14:
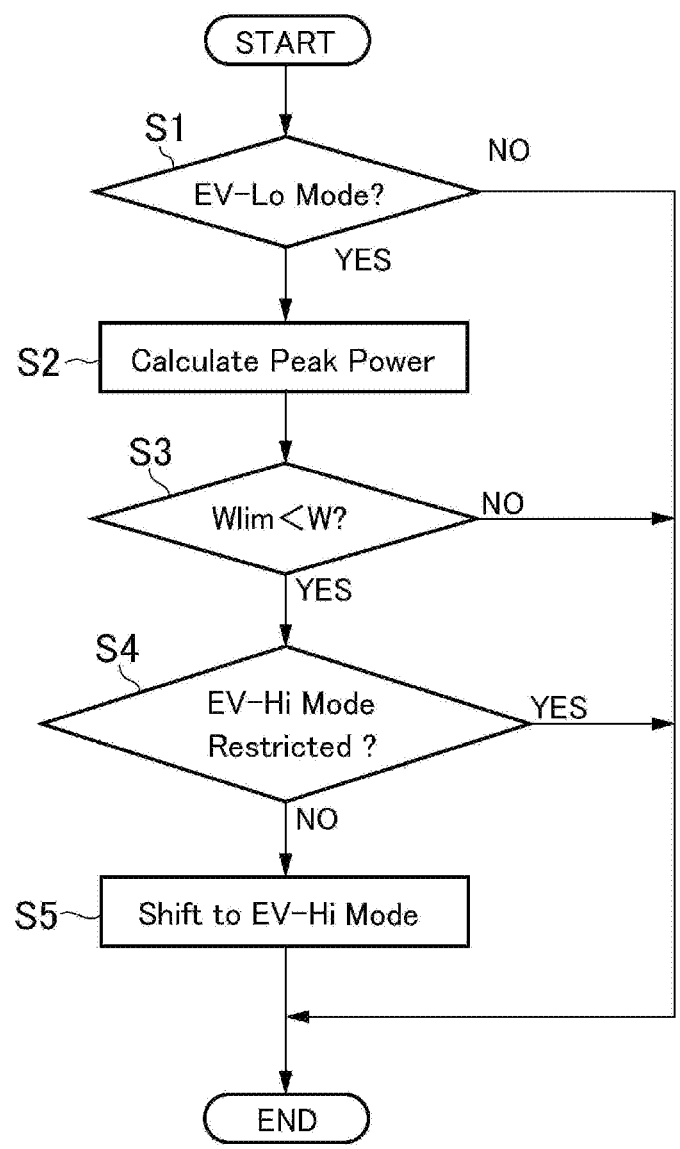
FIG. 14 is a flowchart showing one example of a routine executed by the control system according to the embodiment.

As described, if the engine 2 is started by the first motor 3 during propulsion in the EV-Lo mode at a high speed, a large amount of electric power will be generated and hence an electric power larger than the upper limit input power Wlim may be applied to the battery 31. By contrast, if the engine 2 is started at a speed at which the input power to the battery 31 will not exceed the upper limit input power Wlim, fuel efficiency may be reduced. In order to avoid those disadvantages, the control system according to the embodiment is configured to permit selection of the EV-Lo mode based on the upper limit input power Wlim. An example of the routine executed by the control system is shown in FIG. 14.

At step S1, it is determined whether or not the hybrid vehicle 1 is currently propelled in the EV-Lo mode. To this end, for example, a flag representing an establishment of the EV-Lo mode is turned on when the operating mode is shifted to the EV-Lo mode, and turned off when the operating mode is shifted to other modes from the EV-Lo mode. According to the embodiment, therefore, such determination at step S1 is made based on the flag.

If the hybrid vehicle 1 is not propelled in the EV-Lo mode, in other words, if the hybrid vehicle 1 is propelled in the HV mode or the EV-Hi mode so that the answer of step S1 is NO, the routine is terminated without carrying out any specific control. By contrast, if the hybrid vehicle 1 is currently propelled in the EV-Lo mode so that the answer of step S1 is YES, the routine progresses to step S2 to calculate the peak power W supplied to the battery 31 (i.e., a maximum input power to the battery 31) to start the engine 2, with reference to the map shown in FIG. 13. Instead, the peak power W may also be obtained based on a difference (Wg-Wm) between: a power generation Wg of the first motor 3 calculated by multiplying a torque required to start the engine 2 by a speed of the first motor 3 at the current vehicle speed; and a power consumption Wm calculated based on an output torque of the second motor 4 to maintain the current required torque.

Then, it is determined at step S3 whether or not the peak power W calculated at step S2 is greater than the upper limit input power Wlim to the battery 31. That is, it is determined whether or not a surplus electric power exceeding the upper limit input power Wlim can be accumulated in the battery 31. As described, the upper limit input power Wlim may be altered depending on the temperatures of the battery 31 and the power control systems 29, the SOC level of the battery 31 and so on. Optionally, at step S3, it is also possible to determine whether or not a value calculated by adding a predetermined power to the peak power W is greater than a value calculated by subtracting a predetermined power from the upper limit input power Wlim.

If the peak power W is smaller than the upper limit input power Wlim so that the answer of step S3 is NO, this means that the electric power greater than the upper limit input power Wlim will not be supplied to the battery 31 even if the engine 2 is started by the first motor 3. In this case, therefore, the routine is terminated without carrying out the subsequent controls. That is, the EV-Lo mode is maintained.

By contrast, if the peak power W is greater than the upper limit input power Wlim so that the answer of step S3 is YES, this means that the electric power greater than the upper limit input power Wlim may be supplied to the battery 31 if the engine 2 is started by the first motor 3. However, the engine 2 is not required to be started immediately in this situation and hence it is possible to maintain the EV-Lo mode. In addition, the driver or the system may intend to maintain the EV-Lo mode.

In this case, therefore, it is determined at step S4 whether or not the selection of the EV-Hi mode is restricted by the driver or the system. For example, the selection of the EV-Hi mode is restricted if a switch to select a sports mode is turned on, if a selection of the sports mode is determined based on a past data, or if a switch to select the EV mode is turned on. Specifically, the sports mode is selected to increase the drive torque and the brake torque with respect to a required value to enhance acceleration and agility of the vehicle.

In the case that a condition to select the sports mode is satisfied, it is preferable to maintain the EV-Lo mode to generate a larger drive force. In addition, in the case that the switch to select the EV mode is turned on, the operating mode will not be shifted to the HV mode immediately. In those cases, the engine 2 will not be started immediately. That is, since the EV-Lo mode is currently selected to operate the first motor 3 and the second motor 4 in an efficient manner, the selection of the EV-Hi mode is restricted in those cases. Specifically, in the case that the switch to select the EV mode is turned on, the electric power greater than the upper limit input power Wlim may not be generated even if the engine 2 is started by the first motor 3 in the EV-Lo mode. Therefore, if the selection of the EV-Hi mode is restricted by the driver or the system so that the answer of step S4 is YES, the routine is terminated without carrying out the subsequent controls. That is, the EV-Lo mode is maintained.

By contrast, if the selection of the EV-Hi mode is not restricted by the driver or the system so that the answer of step S4 is NO, the routine progresses to step S5 to shift the operating mode from the EV-Lo mode to the EV-Hi mode. Thereafter, the routine is terminated. To this end, specifically, the first clutch CL1 is disengaged, and then the rotational speed of the first motor 3 is adjusted to a speed calculated based on the current vehicle speed and the gear ratio in the EV-Hi mode. In this situation, since the first clutch CL1 is in disengagement, a large reaction force is not applied to the first motor 3. That is, the rotational speed of the first motor 3 may be changed by a relatively small torque. For this reason, generation amount of the first motor 3 while changing the rotational speed thereof is smaller than the upper limit input power Wlim. Thereafter, the second clutch CL2 is engaged and the first motor 3 generates the drive torque.

Thus, the permission of selection of the EV-Lo mode is determined by comparing the peak power W during cranking the engine 2 with the upper limit input power Wlim. If the peak power W is greater than the upper limit input power Wlim, the EV-Lo mode is no longer maintained and the operating mode is shifted to the EV-Hi mode. According to the embodiment, therefore, an excessive power input and an excessive current supply to the battery 31, as well as an excessive current supply to the first power control system 29 may be prevented when shifting the operating mode from the EV mode to the HV mode. For this reason a damage on the battery 31 and the first power control system 29 may be reduced.

Specifically, if the peak power W during cranking the engine 2 is expected to exceed the upper limit input power Wlim, the operating mode is shifted to the EV-Hi mode. For this reason, it is not necessary to shift the operating mode from the EV-Lo mode to the HV mode as long as the peak power W is smaller than the upper limit input power Wlim. In other words, the hybrid vehicle 1 is allowed to propel in the EV mode while stopping the engine 2 for a longer time to save the fuel.

In addition, when the selection of the EV-Hi mode is restricted by the driver or the system, the operating mode is maintained to the EV-Lo mode in line with the intension of the driver or the system. In other words, when a relatively large drive torque is required, unintentional drop in the drive torque resulting from shifting to the EV-Hi mode can be prevented. Further, an operating point of the first motor 3 in the EV mode will not be restricted unintentionally by an unintentional shifting to the EV-Hi mode.

Although the above exemplary embodiments of the present application have been described, it will be understood by those skilled in the art that the present application should not be limited to the described exemplary embodiments, and various changes and modifications can be made within the spirit and scope of the present application. For example, the hybrid vehicle according to the embodiment may be modified as long as: the EV mode in which the hybrid vehicle is powered by the first motor while applying a reaction torque to the output shaft 13 by the brake B1 can be established; a speed ratio between the first motor 3 and the drive wheels 28R and 28L can be changed; and the engine 2 can be started by the first motor 3. Hereinafter, modification examples of the hybrid vehicle will be explained with reference to FIGS. 15 to 20. In the following explanation, common reference numerals are allotted to in common with those of the foregoing embodiment, and detailed explanation for the common elements will be omitted.

Figure 15:
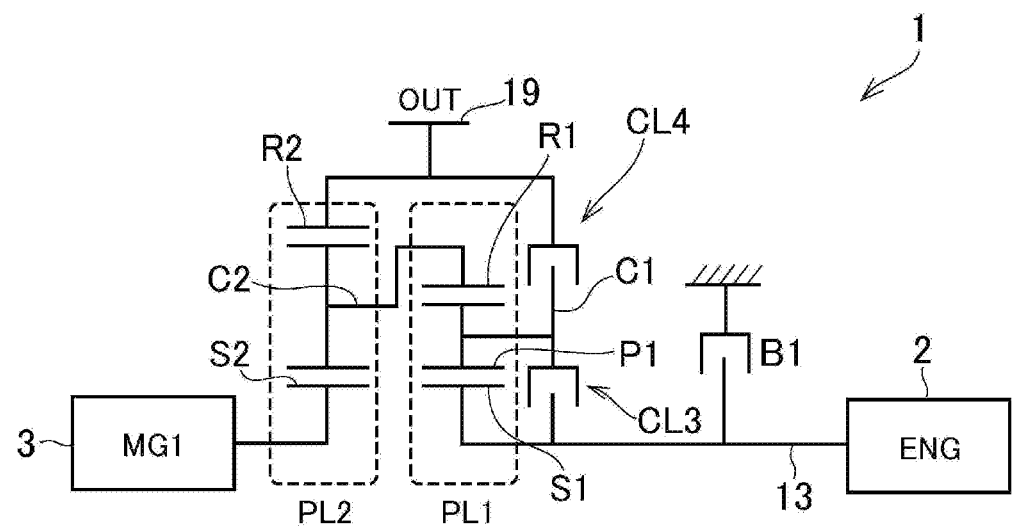
FIG. 15 is a skeleton diagram showing a structure of the drive unit according to another embodiment.

The hybrid vehicle shown in FIG. 15 comprises a first differential mechanism PL1 connected directly to the engine 2, and a second differential mechanism PL2 connected directly to the first motor 3.

The first differential mechanism PL1 is a single-pinion planetary gear unit comprising: a sun gear S1 formed around the output shaft 13 of the engine 2; a ring gear R1 arranged concentrically with the sun gear S1; pinion gears P1 interposed between the sun gear S1 and the ring gear R1 while being meshed with both gears S1 and R1; and a carrier C1 supporting the pinion gears P1 in a rotatable manner.

The second differential mechanism PL2 is also a single-pinion planetary gear unit comprising: a sun gear S2 connected to the first motor 3; a carrier C2 connected to the ring gear R1 of the first differential mechanism PL1; and a ring gear R2 connected to the output gear 19. The output gear 19 is meshed with the driven gear 21 to distribute the torque to the drive wheels 28R and 28L.

In the first differential mechanism PL1, the sun gear S1 and the carrier C1 are engaged to each other through a third clutch CL3 to rotate the rotary elements of the first differential mechanism PL1 integrally. The carrier C1 of the first differential mechanism PL1 and the ring gear R2 of the second differential mechanism PL2 are engaged to each other through a fourth clutch CL4. The brake B1 is disposed on the output shaft 13 of the engine 2. For example, a friction clutch and a dog clutch may also be used individually as the clutches CL3 and CL4.

In the hybrid vehicle 1 shown in FIG. 15, the output torque of the first motor 3 may also be delivered to the drive wheels 28R and 28L by engaging the brake B1 while engaging any one of the third clutch CL3 and the fourth clutch CL4.

Figure 16:
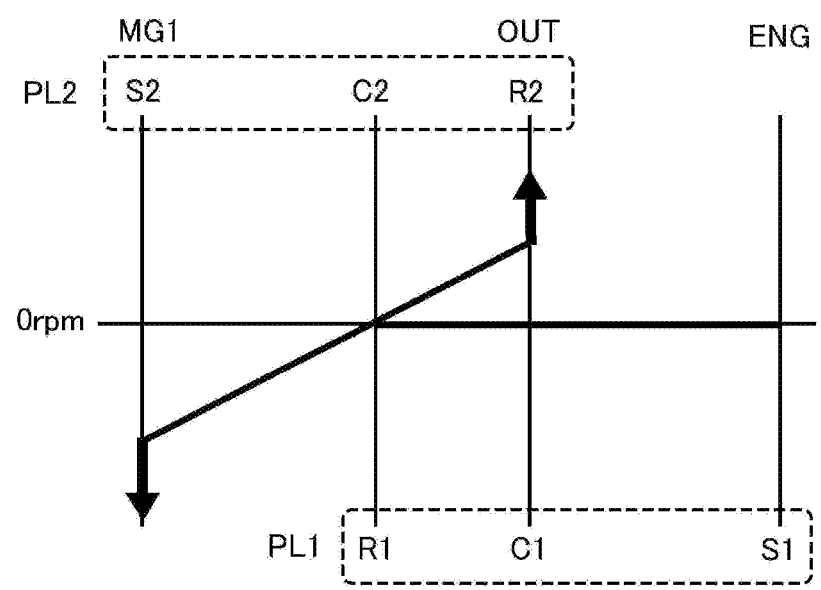
FIG. 16 is a nomographic diagram showing a situation of the drive unit shown in FIG. 15 in the EV-Hi mode.

As indicated in FIG. 16, in the hybrid vehicle 1 shown in FIG. 15, the EV-Hi mode is established by engaging the brake B1 and the third clutch CL3. In the EV-Hi mode, therefore, the first differential mechanism PL1 is stopped and the carrier C2 of the second differential mechanism PL2 is stopped. Accordingly, the sun gear S2 of the second differential mechanism PL2 serves as an input element, the ring gear R1 of the first differential mechanism PL1 or the carrier C2 of the second differential mechanism PL2 serve as a reaction element, and the ring gear R2 of the second differential mechanism PL2 serves as an output element. In the EV-Hi mode, therefore, a torque of the sun gear S2 of the second differential mechanism PL2 is delivered to the ring gear R2 of the second differential mechanism PL2 while being reversed.

Figure 17:
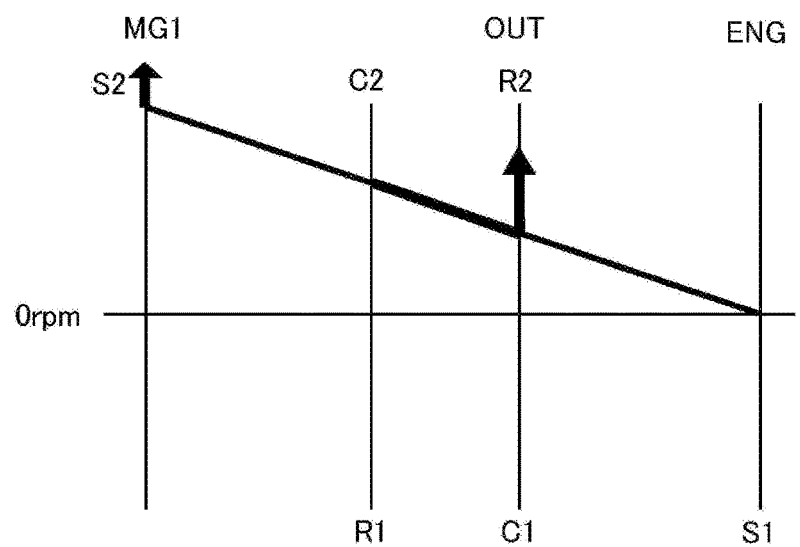
FIG. 17 is a nomographic diagram showing a situation of the drive unit shown in FIG. 15 in the EV-Lo mode.

As indicated in FIG. 17, in the hybrid vehicle 1 shown in FIG. 15, the EV-Lo mode is established by engaging the brake B1 and the fourth clutch CL4. In the EV-Lo mode, therefore, the carrier C2 of the second differential mechanism PL2 and the ring gear R2 of the second differential mechanism PL2 are rotated integrally. As described, the ring gear R1 of the first differential mechanism PL1 is connected to the second differential mechanism PL2. Accordingly, the sun gear S2 of the second differential mechanism PL2 serves as an input element, the sun gear S1 of the first differential mechanism PL1 serves as a reaction element, and the ring gear R2 of the second differential mechanism PL2 serves as an output element. In the EV-Lo mode, therefore, the torque of the sun gear S2 of the second differential mechanism PL2 is delivered to the ring gear R2 of the second differential mechanism PL2 while being multiplied.

As can be seen from FIGS. 16 and 17, in the EV-Lo mode, a rotational speed of the first motor 3 is higher than that in the EV-Hi mode. In addition, cranking of the engine 2 may be executed in any of the EV-Lo mode and the EV-Hi mode by disengaging the brake B1 while reducing a rotational speed of the first motor 3. In the hybrid vehicle 1 shown in FIG. 15, therefore, the input power to the battery 31 may be increased if the engine 2 is started by the first motor 3 during propulsion in the EV-Lo mode. For this reason, it is preferable to shift the operating mode to the EV-HI mode if the peak power W is expected to exceed the upper limit input power Wlim.

Figure 18:
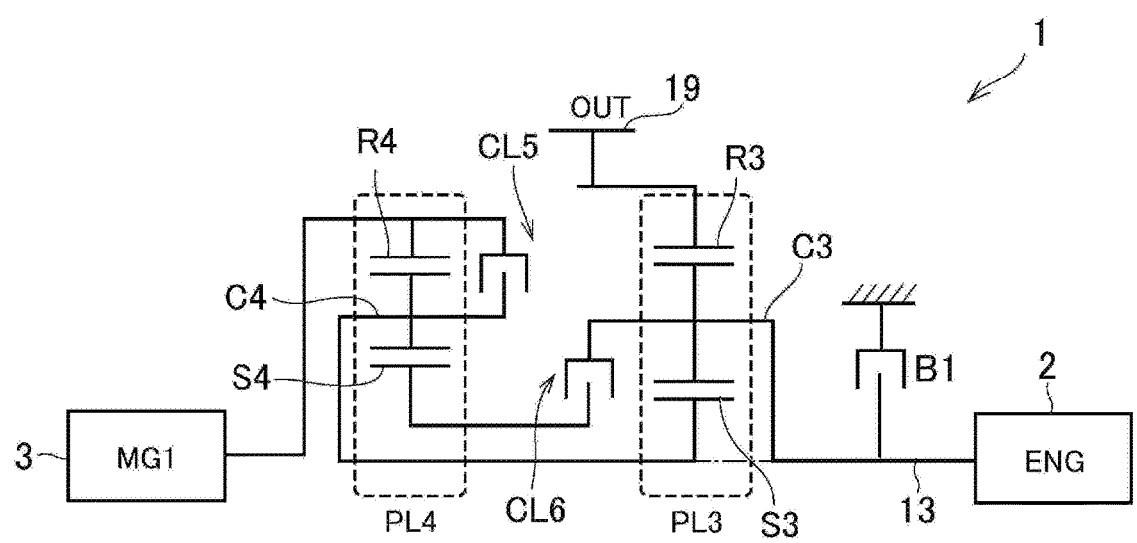
FIG. 18 is a skeleton diagram showing a structure of the drive unit according to still another embodiment.

The hybrid vehicle 1 shown in FIG. 18 comprises a third differential mechanism PL3 connected directly to the engine 2, and a fourth differential mechanism PL4 connected directly to the first motor 3.

The third differential mechanism PL3 is also a single-pinion planetary gear unit comprising: a carrier C3 connected to the output shaft 13 of the engine 2; a sun gear S3; and a ring gear R3 connected to the output gear 19. The output gear 19 is also meshed with the driven gear 21 to distribute the torque to the front wheels 28R and 28L.

The fourth differential mechanism PL4 is also a single-pinion planetary gear unit comprising: a ring gear R4 connected to the first motor 3; a carrier C4 connected to the sun gear S3 of the third differential mechanism PL3; and a sun gear S4.

In the fourth differential mechanism PL4, the carrier C4 and the ring gear R4 are engaged to each other through a fifth clutch CL5 to rotate the rotary elements of the fourth differential mechanism PL4 integrally. The carrier C3 of the third differential mechanism PL3 and the sun gear S4 of the fourth differential mechanism PL4 are engaged to each other through a sixth clutch CL6. The brake B1 is also disposed on the output shaft 13 of the engine 2. For example, a friction clutch and a dog clutch may also be used individually as the clutches CL5 and CL6.

In the hybrid vehicle 1 shown in FIG. 18, the output torque of the first motor 3 may also be delivered to the drive wheels 28R and 28L by engaging the brake B1 while engaging any one of the fifth clutch CL5 and the sixth clutch CL6.

Figure 19:
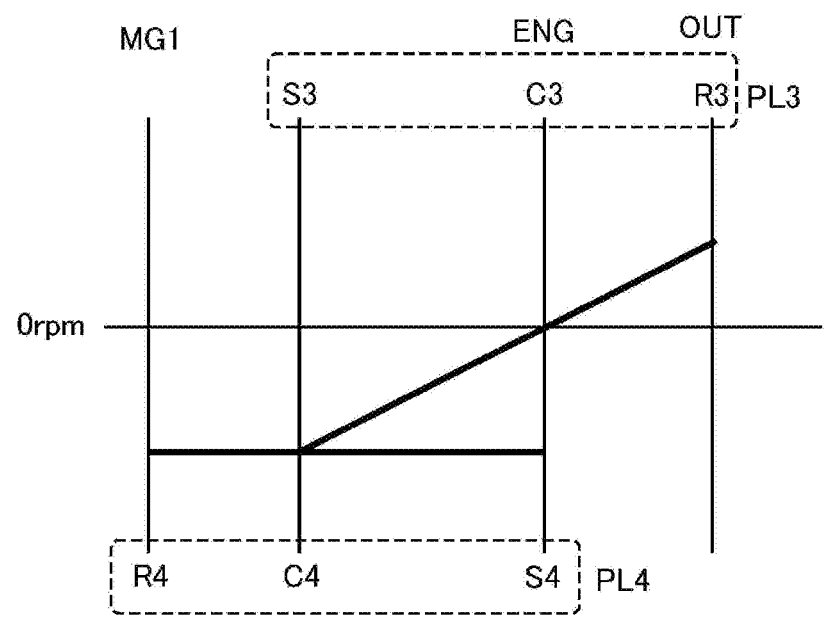
FIG. 19 is a nomographic diagram showing a situation of the drive unit shown in FIG. 18 in the EV-Hi mode.

As indicated in FIG. 19, in the hybrid vehicle 1 shown in FIG. 18, the EV-Hi mode is established by engaging the brake B1 and the fifth clutch CL5. In the EV-Hi mode, therefore, the rotary elements of the fourth differential mechanism PL4 are rotated integrally. Since the sun gear S3 of the third differential mechanism PL3 is connected to the carrier C4 of the fourth differential mechanism PL4, the torque of the first motor 3 is delivered to the sun gear S3 without being changed. In addition, since the brake B1 is in engagement, the carrier C3 of the third differential mechanism PL3 serves as a reaction element to deliver the reversed torque to the ring gear R3.

Figure 20:
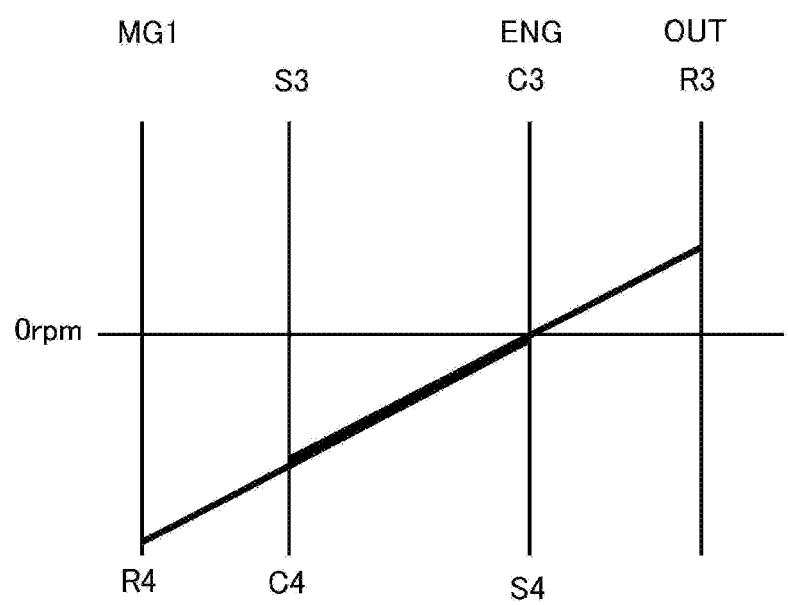
FIG. 20 is a nomographic diagram showing a situation of the drive unit shown in FIG. 18 in the EV-Lo mode.

As indicated in FIG. 20, in the hybrid vehicle 1 shown in FIG. 18, the EV-Lo mode is established by engaging the brake B1 and the fourth clutch CL4. In the EV-Lo mode, therefore, the carrier C3 of the third differential mechanism PL3 and the sun gear S4 of the fourth differential mechanism PL4 are rotated integrally. As described, the sun gear R3 of the third differential mechanism PL3 is connected to the carrier C4 of the fourth differential mechanism PL4. Accordingly, the ring gear S4 of the fourth differential mechanism PL4 serves as an input element, the carrier C3 of the third differential mechanism PL3 serves as a reaction element, and the ring gear R3 of the third differential mechanism PL3 serves as an output element. In the EV-Lo mode, therefore, the torque of the ring gear R4 of the fourth differential mechanism PL4 is delivered to the ring gear R3 of the third differential mechanism PL3 while being multiplied.

As can be seen from FIGS. 19 and 20, in the EV-Lo mode, a rotational speed of the first motor 3 is higher than that in the EV-Hi mode. In addition, cranking of the engine 2 may be executed in any of the EV-Lo mode and the EV-Hi mode by disengaging the brake B1 while reducing a rotational speed of the first motor 3. In the hybrid vehicle 1 shown in FIG. 15, therefore, the input power to the battery 31 may be increased if the engine 2 is started by the first motor 3 during propulsion in the EV-Lo mode. For this reason, it is preferable to shift the operating mode to the EV-HI mode if the peak power W is expected to exceed the upper limit input power Wlim.

Thus, in the hybrid vehicles shown in FIGS. 1, 15, and 18, the first differential mechanism is adapted to perform a differential action among a first rotary element connected to an engine; a second rotary element connected to a motor; and a third rotary element connected to drive wheels. The second differential mechanism is also adapted to perform a differential action among: a fourth rotary element; a fifth rotary element connected to the third rotary element; and a sixth rotary element. Each of the hybrid vehicles individually comprises: a first engagement device that selectively connects the sixth rotary element to the first rotary element or the second rotary element; and a second engagement device that selectively connects any two of the first rotary element, the second rotary element, and the third rotary element, or connects any two of the fourth rotary element, the fifth rotary element, and the sixth rotary element. In the hybrid vehicles, the first electric vehicle mode is established by applying a brake torque to the first rotary member by the brake while connecting any two of the fourth rotary element, the fifth rotary element, and the sixth rotary element by the second engagement device, and the second electric vehicle mode is established by applying a brake torque to the first rotary member by the brake while connecting the sixth rotary element to the first rotary element or the second rotary element by the first engagement device.

What is claimed is:

1. A control system for a hybrid vehicle, comprising:
a differential mechanism including a first rotary member connected to an engine, a second rotary member connected to a rotary machine, and a third rotary member connected to drive wheels;
a battery that supplies electric power to the rotary machine and that is charged with electric power generated by the rotary machine,
wherein the differential mechanism is adapted to establish a first electric vehicle mode in which a ratio of a rotational speed of the drive wheel to a rotational speed of the rotary machine becomes a first predetermined value, and a second electric vehicle mode in which said ratio becomes a second predetermined value that is greater than the first predetermined value, and
a controller that selects an electric vehicle mode from the first electric vehicle mode and the second electric vehicle mode,
wherein the controller is configured to:
crank the engine by operating the rotary machine to generate a torque in such a manner as to reduce a rotational speed of the rotary machine when shifting the operating mode from the first electric vehicle mode or the second electric vehicle mode to a hybrid mode in which the hybrid vehicle is propelled by generating a drive torque by the engine while establishing a reaction torque by the rotary machine;
calculate a peak power, that is a maximum value of an input power to the battery from the rotary machine during a period from a commencement of the cranking of the engine to a termination of the cranking of the engine, to start the engine to shift the operating mode from the first electric vehicle mode to the hybrid mode;
determine whether or not the peak power is greater than an upper limit input power to the battery; and
shift the operating mode from the first electric vehicle mode to the second electric vehicle mode if the peak power is greater than an upper limit input power to the battery; and
a brake that applies a negative torque to the first rotary member to reduce a rotational speed of the first rotary member,
wherein the controller is further configured to:
establish the first electric vehicle mode and the second electric vehicle mode by applying the negative torque to the first rotary member by the brake, and
crank the engine by reducing the negative torque applied to the first rotary member by the brake while operation the rotary machine to generate a torque in such a manner as to reduce a rotational speed of the rotary machine, when shifting the operating mode from the first electric vehicle mode or the second electric vehicle mode to the hybrid mode.

2. The control system for a hybrid vehicle as claimed in claim 1, wherein the controller is further configured to:
determine whether or not a shifting, of the operating mode from the first electric vehicle mode to the second electric vehicle mode is restricted; and
prevent a shifting the operating mode from the first electric vehicle mode to the second electric vehicle mode if the shifting the operating mode from the first electric vehicle mode to the second electric vehicle mode is restricted, even if the peak power is greater than the upper limit input power to the battery.

3. The control system for a hybrid vehicle as claimed in claim 1, further comprising:
another rotary machine that is connected to the drive wheels to deliver the torque to the drive wheels,
wherein said another rotary machine is driven by the electric power supplied from the rotary machine, and
wherein the controller is further configured to
calculate a power generation of the rotary machine by multiplying a torque required to crank the engine by a speed of the rotary machine at a current vehicle speed,
calculate a power consumption based on an output torque of said another rotary machine to maintain a required torque, and
calculate the peak power by subtracting the power consumption from the power generation.

4. The control system for a hybrid vehicle as claimed in claim 1, wherein a direction of the torque generated by the rotary machine to crank the engine is opposite to the reaction torque.

5. The control system for a hybrid vehicle as claimed in claim 4,
wherein the differential mechanism includes:
a first differential mechanism adapted to perform a differential action among a first rotary element as one of said three rotary members, a second rotary element as another one of said three rotary members, and a third rotary element; and
a second differential mechanism adapted to perform a differential action among a fourth rotary element as still another one of said three rotary members, a fifth rotary element connected to the third rotary element and a sixth rotary element,
the control system further comprises:
a first engagement device that selectively connects the sixth rotary element to the first rotary element or the second rotary element; and
a second engagement device that selectively connects any two of the first rotary element, the second rotary element, and the third rotary element, or connects any two of the fourth rotary element, the fifth rotary element, and the sixth rotary element,
wherein the first electric vehicle mode is established by applying a brake torque to the first rotary member by the brake while connecting any two of the fourth rotary element, the fifth rotary element, and the sixth rotary element by the second engagement device, and
wherein the second electric vehicle mode is established by applying a brake torque to the first rotary member by the brake while connecting the sixth rotary element to the first rotary element or the second rotary element by the first engagement device.

6. The control system for a hybrid vehicle as claimed in claim 5, wherein the first rotary element includes the first rotary member,
the second rotary element includes the second rotary member,
the fourth rotary element includes the third rotary member,
the first engagement device is adapted to selectively connect the sixth rotary element to the first rotary element, and
the second engagement device is adapted to selectively connect the fourth rotary element to the sixth rotary element.

* * * * *